(12) United States Patent
Watson (10) Patent No.: US 7,049,957 B2
(45) Date of Patent: May 23, 2006

(54) LOCAL AREA POSITIONING SYSTEM

(75) Inventor: Mitchell L. Watson, Clackamas, OR (US)

(73) Assignee: WCR Company, Portland, OR (US)

( * ) Notice: Subject to any disclaimer, the term of this patent is extended or adjusted under 35 U.S.C. 154(b) by 343 days.

(21) Appl. No.: 10/664,809

(22) Filed: Sep. 16, 2003

(65) Prior Publication Data

US 2004/0263348 A1    Dec. 30, 2004

Related U.S. Application Data (60) Continuation-in-part of application No. 10/358,458, filed on Feb. 4, 2003, now Pat. No. 6,821,258, which is a division of application No. 09/706,327, filed on Nov. 3, 2000, now Pat. No. 6,524,239.

(60) Provisional application No. 60/411,272, filed on Sep. 16, 2002.

(51) Int. Cl.
   *G08B 1/08* (2006.01)
(52) U.S. Cl. ............. 340/539.13; 340/505; 340/539.1; 340/539.22; 340/539.23
(58) Field of Classification Search .......... 340/539.13, 340/505, 527, 539.1, 539.22, 539.23
   See application file for complete search history.

(56) References Cited

U.S. PATENT DOCUMENTS

| | | | |
|---|---|---|---|
| 4,600,869 A * | 7/1986 | Sekine et al. .......... | 318/568.13 |
| 5,343,869 A | 9/1994 | Pross et al. | |
| 5,410,471 A | 4/1995 | Alyfuku et al. | |
| 5,629,719 A * | 5/1997 | Cahill, III .................. | 345/620 |
| 5,692,215 A | 11/1997 | Kutzik et al. ............... | 395/838 |
| 5,780,798 A | 7/1998 | Hall-Jackson | |
| 5,950,632 A | 9/1999 | Reber et al. | |
| 6,050,940 A | 4/2000 | Braun et al. | |
| 6,073,046 A | 6/2000 | Patel et al. | |
| 6,113,539 A | 9/2000 | Ridenour | |
| 6,290,646 B1 | 9/2001 | Cosentino et al. | |
| 6,302,844 B1 | 10/2001 | Walker et al. | |
| 6,430,440 B1 * | 8/2002 | McNeil et al. ................ | 607/19 |

OTHER PUBLICATIONS

Stanford, "Using Pervasive Computing to Deliver Elder Care," *Pervasive Computing*, vol. 1, No. 1 (Jan.-Mar. 2002).
Moody, "Oatfield Estates, Assisted Living Community Offers New Options," *The Business Journal*, vol. 19, No. 50 (Feb. 7, 2003).
Macht, "Estate Aged," *Urban Land* (Oct. 2001).

(Continued)

*Primary Examiner*—Daryl C Pope
(74) *Attorney, Agent, or Firm*—Marger Johnson & McCollom, P.C.

(57) ABSTRACT

A positioning system includes a command signal generator, a subject module, a plurality of sensor modules, and a plurality of counters. A comparator compares the plurality of increments and generate a plurality of counter differential values; and a correlator correlates the plurality of counter differential values to determine a subject location in the defined space.

A method for locating a subject includes transmitting a signal to a subject unit; transmitting a signal to slave units located within the defined three-dimensional space, such that each slave unit starts a 1 GHz counter; transmitting a subject signal from the subject unit; stopping said counters; determining net counter values; comparing the net counter values to determine counter difference values; and correlating said counter difference values to determine a subject unit location in the three-dimensional space.

15 Claims, 7 Drawing Sheets

LAPS BASIC SYSTEM
BLOCK DIAGRAM

OTHER PUBLICATIONS

Edwards, "Striving to Achieve, Aging in Place," *Nursing Homes, Long Term Care Management,* vol. 51, No. 2 (Feb. 2002).

Barnett, "House Wired, An Assisted-living Center Goes High-tech to Care for Its Residents," *The Oregonian,* TechNW (Jun. 26, 2000).

Fox, "Technogenarians," *Wired* (Nov. 2001).

Shellenbarger, "Technology Holds Promise for Easing Families' Worries Over the Elderly," *The Wall Street Journal,* Personal Journal (Jul. 25, 2002).

Shellenbarger, "The Brave New World of Eldercare, Gadgets Track Loved One's Every Move," *The Wall Street Journal,* Personal Journal (Jul. 18, 2002).

Donahue, "Byte, Byte, Against the Dying of the Light," *The Atlantic Monthly* (May 2001).

Johnston, "Oatfield Estates, A Senior Community Profile," *The Oregonian,* Homes & Real Estate (Sep. 16, 2001).

Gelhaus, "High-Tech Homes, Mean A Brighter Future For Seniors," *Provider* (Sep. 2002).

* cited by examiner

LAPS BASIC SYSTEM
BLOCK DIAGRAM
FIGURE 1

MASTER
BLOCK DIAGRAM
FIGURE 2

CALIBRATION UNIT
BLOCK DIAGRAM
FIGURE 5

RESIDENT MODULE
BLOCK DIAGRAM
FIGURE 6

**LAPS SYSTEM SEQUENCE
FLOW CHART
FIGURE 7**

LOCAL AREA POSITIONING SYSTEM

RELATED APPLICATION DATA

This application claims priority to U.S. Ser. No. 60/411,272, filed on Sep. 16, 2002 and incorporated by reference herein for all purposes. The present application also is a continuation-in-part of U.S. Ser. No. 10/358,458, filed on Feb. 4, 2003, now U.S. Pat. No. 6,821,258 which is a divisional application of Ser. No. 09/706,327, now U.S. Pat. No. 6,524,239, filed on Nov. 3, 2000.

BACKGROUND OF THE INVENTION

The present invention relates generally to a system and method for determining a subject spatial location, and more specifically to a system and method for using high-precision counter differentials to determine such locations with high resolution.

Monitoring the location of a person or subject has been limited to "electronic monitoring" using a radio frequency transmitter attached to a subject. The transmitter communicates to a field monitoring device (FMD), which in turn communicates with a central data base system. FMD systems can report when the subject is within a hundred feet of the FMD, as described in U.S. Pat. No. 4,918,432. Once the subject leaves the immediate area of the FMD, the location of the subject is unknown.

Other techniques for locating a subject at a predetermined area utilizes the combination of caller identification and voice recognition, such as that disclosed in U.S. Pat. No. 5,170,426; using Global Positioning System (GPS) satellites; or by polling the subject's portable tracking apparatus by placing a cellular phone call to the apparatuses as disclosed in U.S. Pat. No. 5,461,390.

These location techniques are limited in the ability to locate the subject as they move about, are costly to procure and operate due to frequent wireless radio frequency (RF) communications. Moreover, such systems generally provide poor resolution. The resolution of commercially available non-military GPS-based systems is thirty feet.

Recently, a low power, all body worn tracking apparatus was described in pending patent application entitled "BODY WORN ACTIVE AND PASSIVE TRACKING DEVICE", Ser. No. 09/181,244, filed Oct. 28, 1998. This device, while significantly reducing size, weight, and power costs associated with tracking a subject, still incurs size, weight and power associated with wireless radio frequency (RF) communications in a wide area wireless infrastructure.

Clearly, size, weight and power are critical requirements for any body worn locating device. Recent technology described above affords the ability to combine the elements into a wristwatch form factor to provide an all body worn location recording device.

There exists a need to implement a location recording apparatus for the purpose of recording a subject's movements, such as an ambulatory patient, emergency personnel in a building, and the like. Active and passive tracking systems described in U.S. Pat. No. 5,731,757 and the functionality described in U.S. patent application Ser. No. 09/082,313 into a single body worn tamper resistant active tracking apparatus are not required to simply record the locations of a subject.

DETAILED DESCRIPTION OF PREFERRED EMBODIMENT(S)

Figure 1:
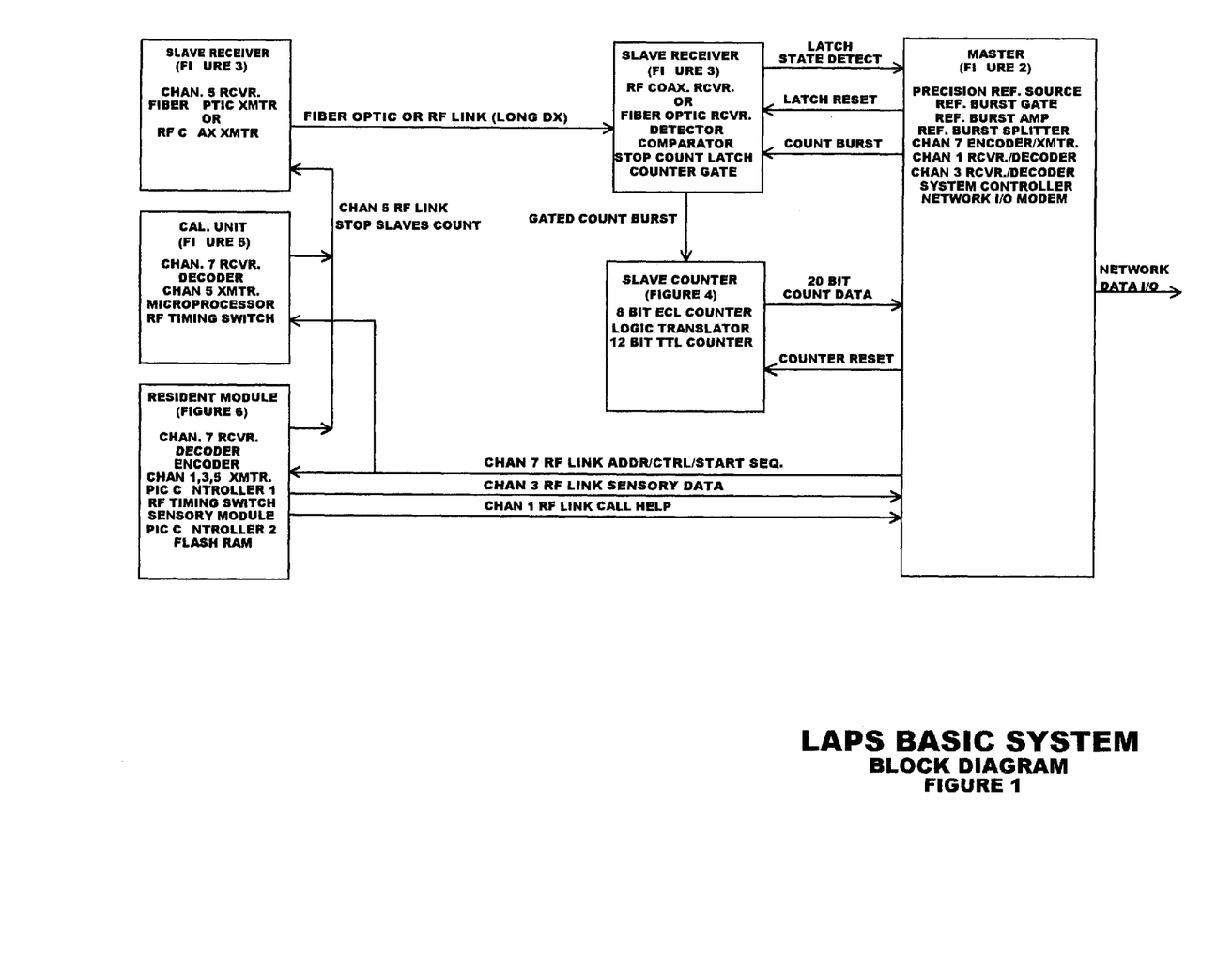
FIG. 1 is a diagram of the local area positioning system as described herein.

Turning to FIG. 1, a local area positioning system includes a Master Unit, four or more Slave Units, a Calibration Unit, and a plurality of Resident Units. Various ancillary components, such as associated antennas, software, and PCs (Personal Computers) also are necessary for system operation. An Uninterruptible Power Supply (UPS) also can be employed.

The system, as described, preferably uses wireless operation between units. With the exception of the Resident Units, all other units can be hard-wired or optically linked to eliminate the need for a radio-frequency (RF) clocking channel and transmitter/receiver hardware. Hardware requirements can vary with end user demands and specifications.

The specific components are discussed in greater detail below.

The Master Unit (FIG. 2) provides controlling functions and is the "brain" of the system. It comprises a precision reference oscillator, or clock, that establishes the timing and precision accuracy of the entire system. The clock standard can be supplied by a receiver tuned to a cellular telephone standard or global positioning satellite (GPS) system standard. Alternatively, the clock standard can be provided by an internal temperature stabilized crystal oscillator.

Figure 3:
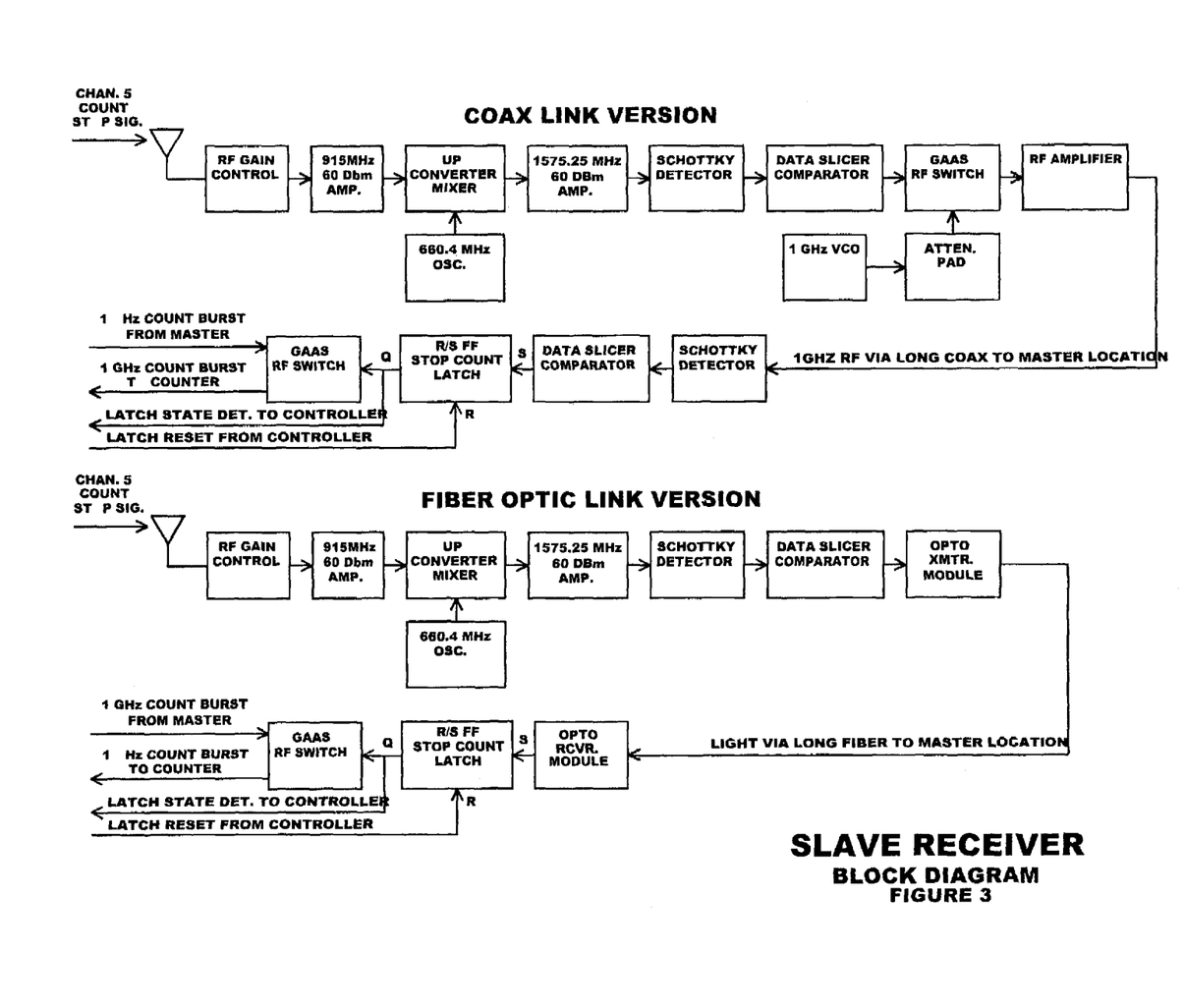
FIG. 3 is a diagram of slave unit of the present system.

Turning to FIG. 3, the Slave Units are sensors used to collect the time encoded data transmitted by the Resident Units. The Slave Units transmit the collected data as commanded to the Master Unit, where it is utilized for position calculations.

Slave Unit hardware can be a microwave up-converting single channel RF receiver and an accurate time counter (FIG. 4) to process high-resolution time base bursts transmitted by the Master Unit. It can also utilize an UPS for power interruption protection. Slave Units have the option to be hard-wired to the Master Unit; alternatively, a wireless transmission feature can be employed as desired.

The Resident Unit (FIG. 6) is the device being monitored for position, sensory, and data information. Each Resident Unit has a unique binary address. When the Resident Unit is polled by the Master Unit, it transmits encoded data that is received by the Slave Unit and Master Units. This data is subsequently used by the Master Unit to display Resident Unit position and sensor information.

Figure 6:
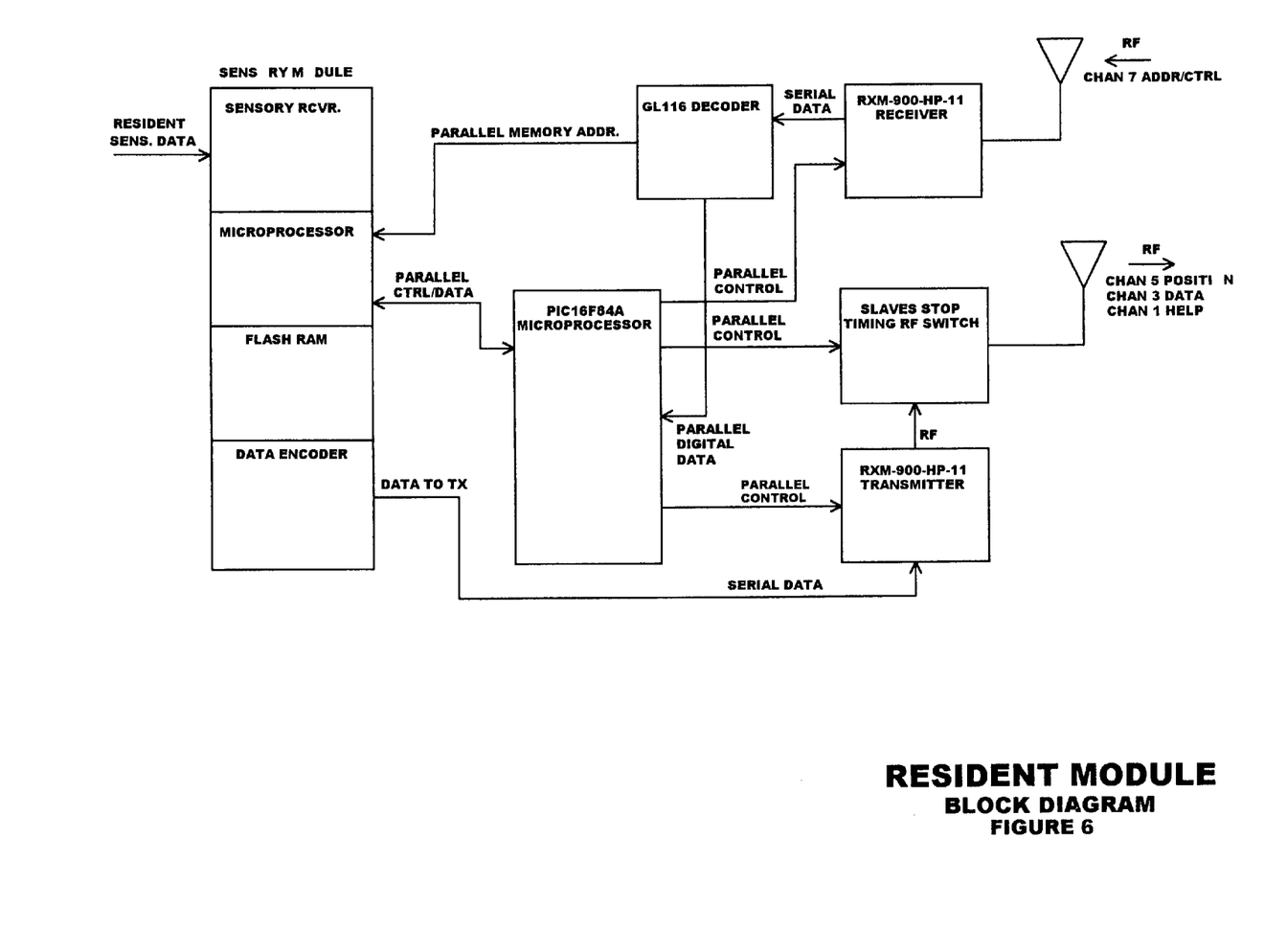
FIG. 6 is a diagram of resident unit as described herein.

Resident Units can be comprised of a UHF (Ultra high frequency) dual-channel RF (radio) receiver and a UHF three channel transmitter, and a PIC for command and control requirements. An optional data module can be employed to receive data from a sensory device and transmit same to the Slave Units or to the Master Unit.

Resident Units preferably are sized to they can be worn as a wristband, pendant, or clipped to a belt or article of clothing. Resident Units preferably are battery powered for mobility. A hard-wired option is not desired for Resident Units, in the interest of subject mobility.

Figure 5:
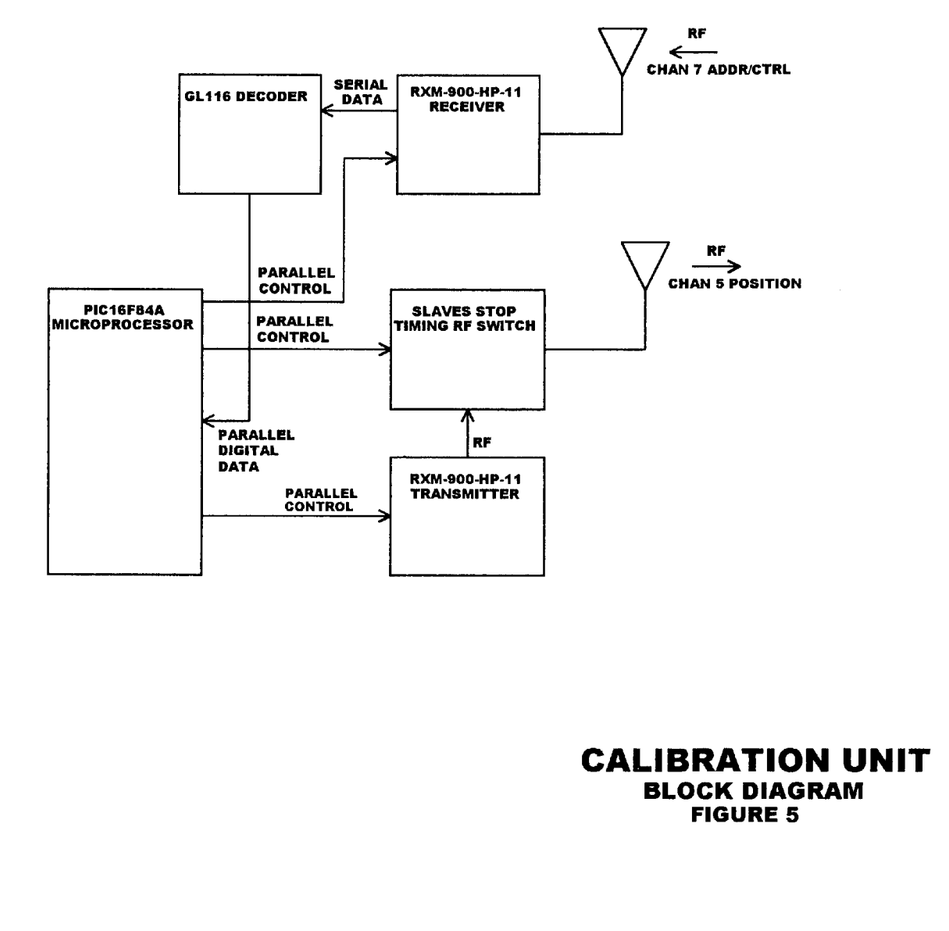
FIG. 5 is a diagram of calibration unit of the present system.

As shown in FIG. 5, the Calibration Unit may be similar to the Resident Unit. It is intended for use in maintaining system calibration and accuracy.

The Calibration Unit can be placed in a precise physical location in relation to the Slave Units and can be polled along with the Resident Units or periodically as a calibration check is desired. The Calibration Unit allows the Master Unit to continually and automatically compensate and adjust for changes in frequency drift (clock), temperatures variations, etc. and other variables that would degrade position accuracy. The Calibration Unit can also be manually polled when additional calibration is necessary. More than one Calibration Unit can be used for increased accuracy and resolution.

The Calibration Unit typically comprises a single-channel RF (radio) receiver and transmitter, similar to that of a Resident Unit, and a PIC for command and control requirements. The Calibration Unit preferably lacks sensory capability, since it is intended to be used as a calibration device. UPS will provide for uninterrupted power protection. Since the Calibration Unit is in a precise fixed location, hard-wired option to the Master Unit is available.

The Master Unit can communicate with Slave Units via RF links, fiber optic cable, coaxial cable, or other well-known means in accordance with customizable installation options. Communication between Resident Units and a Calibration Unit can be via a two- or three-channel RF link. The digital communication between these units can be controlled by a PC and associated software.

Figure 2:
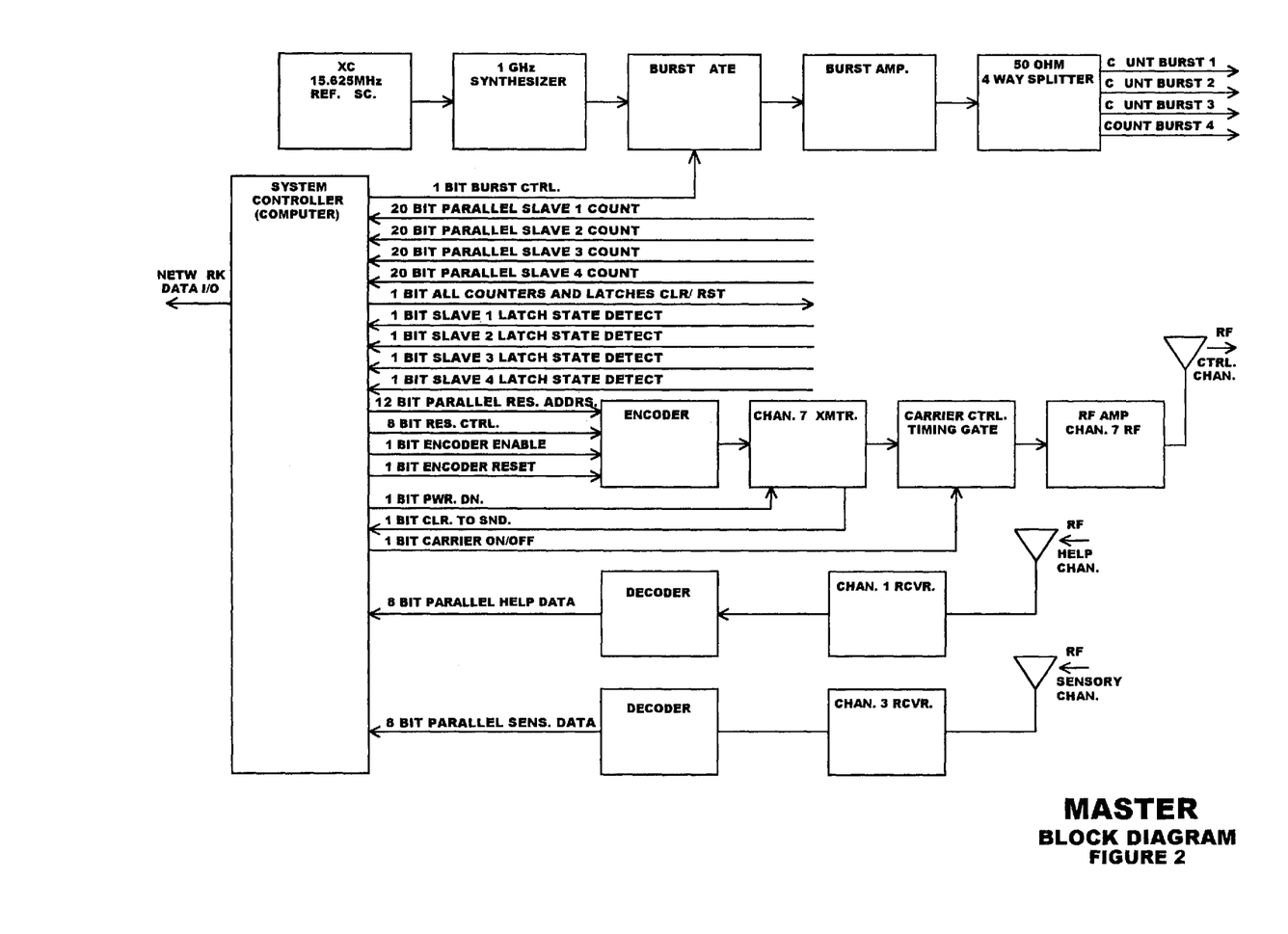
FIG. 2 is a diagram of the master unit of the present system.

Obtained data can be processed and displayed on a Master Unit computer (typically a PC), which can be the same PC used for control functions. Display software can be Microsoft® Windows®-based, allowing operation on any compatible Windows® operating system. Finally, the Master Unit preferably contains network/modem I/O capability for remote operation and a UPS system for power interruption protection.

Figure 7:
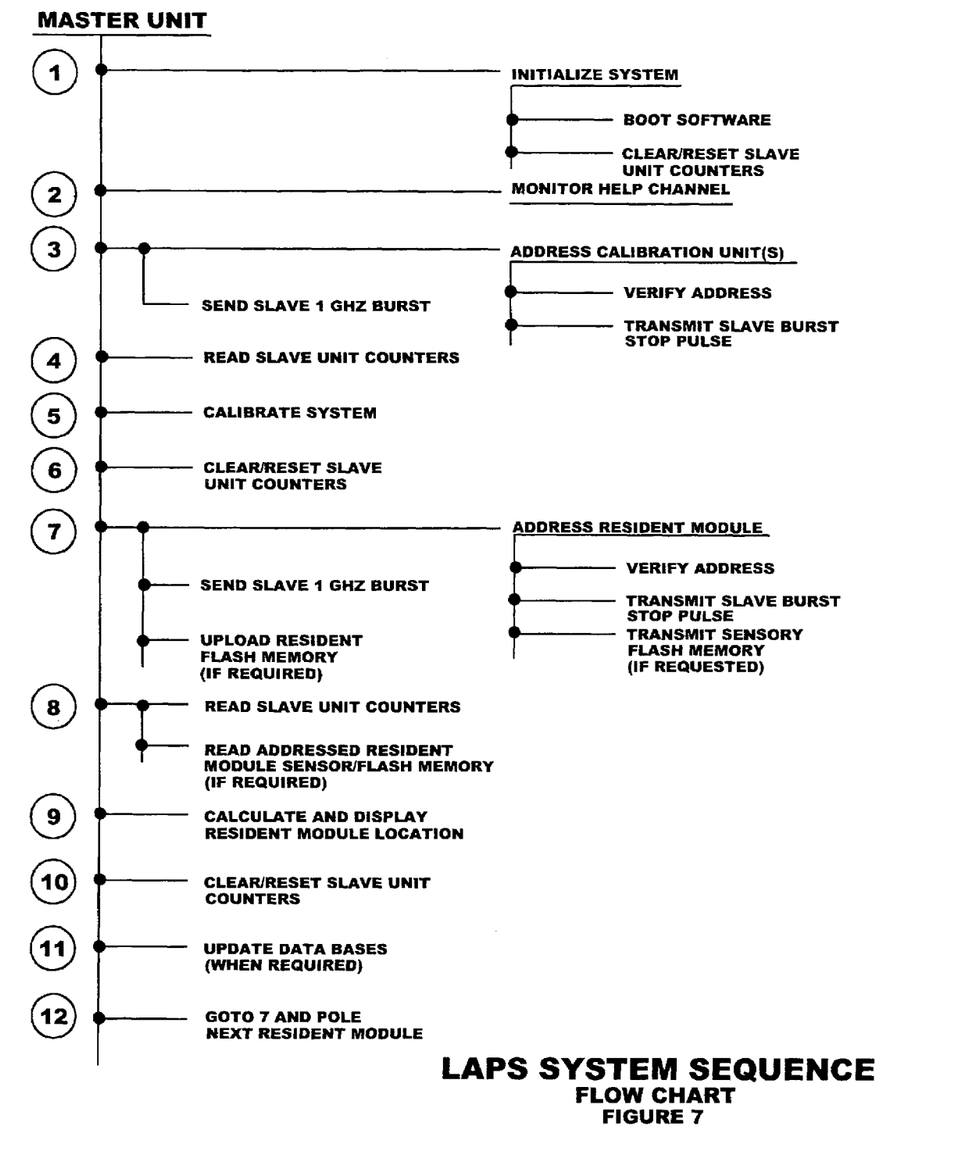
FIG. 7 is a diagram of an exemplary operational sequence of the present system.

With reference now to FIG. 7, the operation of the LAP system and its components is now discussed.

The 1 GHz clock and computer (PC) of the Master Unit (FIG. 2) provide all timing and system command and control functions. The 1 GHz or higher clock speed (as applicable to FCC licensing requirements) is used as the system clock. A 1 GHz frequency translates to a mathematical position resolution of ±twelve (12) inches. The 1 GHz clock frequency can be derived from a variety of sources, such as a cellular telephone standard, a GPS standard, or an internal temperature-stabilized crystal oscillator. These sources can provide a 10 Mhz standard that can be inputted to a frequency synthesizer to generate the 1 GHz clock standard. This clock standard is utilized as a highly accurate burst source for the Slave Unit counters.

A Master Interface Unit preferably interfaces all system units to a PC having the appropriate operating system and software. The Master Interface Unit will utilize a PC for control functions. The Master Interface Unit will consist of appropriate registers, code and decoders, RF (radio) units, and antennas to provide the address and command functions as directed by the system software.

The Master Unit can determine a Resident Unit three-dimensional (3D) position from the contents of each of the four (or more) Slave Unit counters. The polling process for each Resident Unit typically includes clearing (resetting) each of the Slave Unit counters.

With the polling of each Resident Unit, the Master Unit sends a start count command to each Slave Unit counter. Each Slave Unit counter commences counting at the 1 GHz burst clock frequency. The Master Unit also addresses the appropriate Resident Unit that subsequently transmits a counter stop pulse to the Slave Units. Resident Unit address verification can be echoed back to the Master Unit, and any sensory data, if requested and if the sensory module is installed, also can be transmitted to the Master Unit.

The Master Unit then retrieves the count from each of the Slave Unit counters and can reset them for the next polling cycle. The differential time between the Slave Unit counters will be representative of its distance from the polled Resident Unit and will be used for position calculations. The Master Unit will also read the contents of its sensory data register, if requested, completing one polling cycle.

One should note that it is not raw counter values that are compared to determine subject location. Rather, the Master Unit compares the differences in counter values between the Slave Units to determine differential values therebetween. From these differential counter values, a comparator can determine a relationship corresponding to the distance of the Resident Unit from any two Slave Units.

The Master Unit will also poll the Calibration Unit, or units, as part of its polling sequence. It also has the software option to poll a Calibration Unit on demand. The same polling method utilized for Resident Unit polling is used except the Calibration Unit has no sensory data. Since the Calibration Unit is in a precise and known fixed location, it can be used to generate error data due to clock drift, temperature drift, hardware tolerances, etc. The appropriate Master Unit software will have the ability to continually calibrate the system during the normal polling sequence or calibrate on command.

All data processing, position determination, and display functions preferably are provided by the Master Unit PC with the appropriate installed software.

The Slave Units (FIG. 3) comprise a custom designed up converting 900 Mhz microwave receiver, high speed detector and data slicer, switching circuits, and a 1 GHz 20 bit counter. Such units are typically low in price and provide ease of installation and maintenance.

Figure 4:
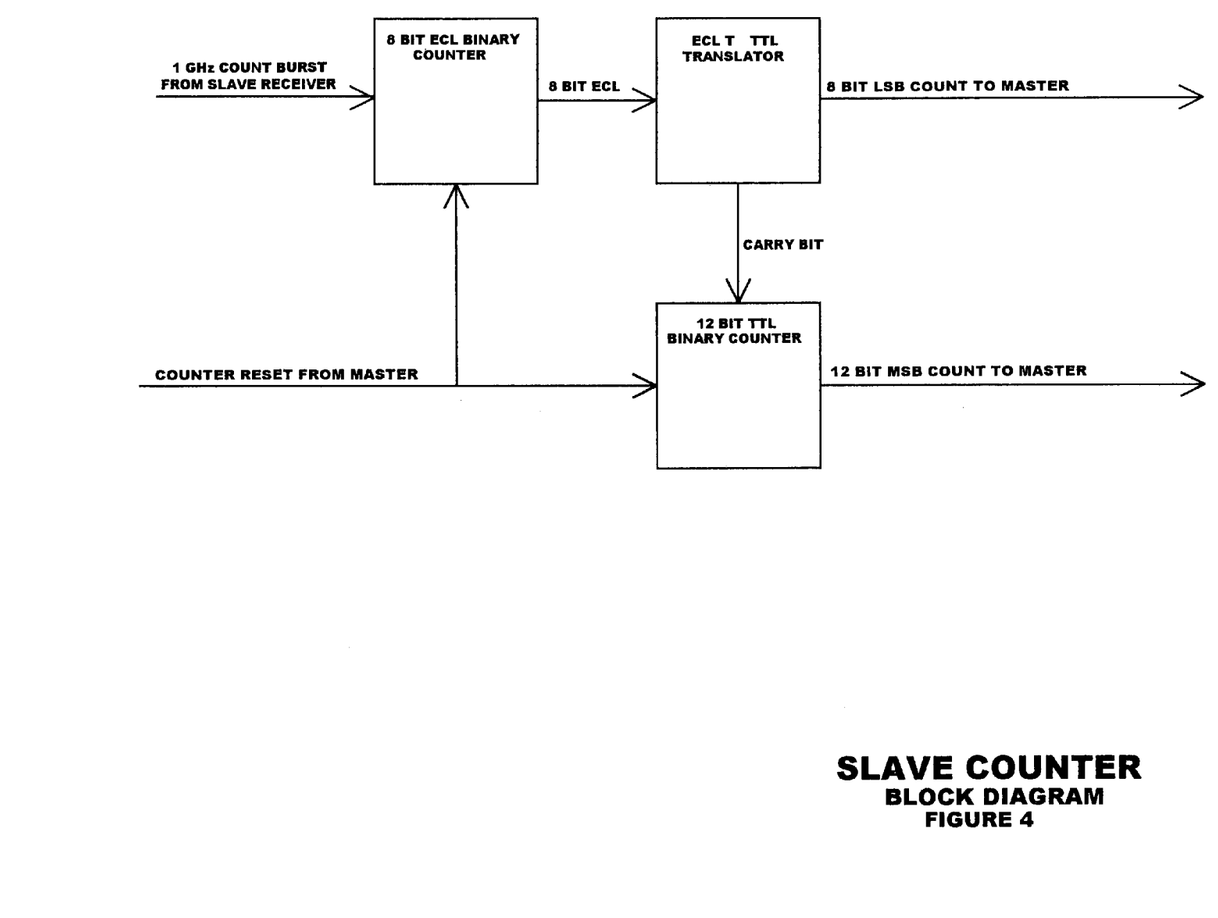
FIG. 4 is a diagram of slave counter as described herein.

Each Slave Unit and associated counter receives a highly accurate 1 GHz burst clock pulse, e.g. via an RF link or optional fiber optic or coaxial link. A highly accurate and stable 10 Mhz source is combined with a frequency synthesizer to produce the 1 GHz burst clock pulse. The 1 GHz pulse in turn gates a 20 bit counter.

The counter can be cleared (reset) and started by the Master Unit while the "stop count" pulse is provided by the Resident Unit. Alternatively, it is apparent that the counter value can be left uncleared. In such case, the counter value existing when a "start count" pulse or command is received from the Master Unit can be subtracted from the counter value when the Resident Unit "stop count" pulse is received to determine an equivalent net count.

Slave Unit count is used for position calculations by the Master Unit. The count differentials between Slave Units are representative of the distance between the Slave Units and the Resident Unit. Upon command, the representative count is sent to the Master Unit. The differential time between counters are compared and the differentials correlated to a Resident Unit position.

The Slave Unit receives Master Unit commands via the Channel 2 RF data link transceiver or optional hard-wire connections. A Resident Unit preferably has a 3-channel 900 MHz receiver, a PIC (microprocessor), encoder/decoder, appropriate data sensors, and Flash Random Access Memory. The Resident Unit provides a "stop count" pulse to the Slave Unit and sensory data to the Master Unit.

The Resident Unit is structured to receive its command functions from the Master Unit, preferably via a 3 channel RF link. Hard-wire provisions are not desired, as the Resident Unit is designed to be attached to or worn by a mobile and location-monitorable subject.

Range of the LAP system is generally up to one mile, but is dependent on the strength of the subject signal and the array of slave units. By disposing slave units within a larger area or volume, the range of the 3D space available for subject tracking can be increased.

The present system advantageously does not utilize strength of signal as a means to determine distance of the subject from the sensors and thereby determine location. A benefit is that Resident Units need not be powerful and therefore do not use large batteries or other requirements that add bulk to the unit.

Command and address verification are control by a PIC. Upon command, the Resident Unit transmits a "stop gate" pulse to each Slave Unit along with address verification and optional sensory data to the Master Unit.

A Calibration Unit is identical to the Resident Unit with the exception that it has no sensory module or sensory capability. The Calibration Unit provides a known precision location to calibrate and verify system accuracy. More than one Calibration Unit can be used to provide higher resolution and accuracy. The Calibration Unit will provide error data to be used by the software for error corrections resulting from clock drift, temperature variations, hardware, etc. Calibration Units are polled during the normal polling sequence or upon command. A GPS receiver can also be incorporated into the Calibration Unit to provide GPS integration for the entire system.

The LAP system described herein is designed as a stand-alone system. The system can be integrated into a global positioning satellite (GPS) environment, if desired. The LAP system as described provides automatic error trapping of false location data. The present system further operates in the FCC low power non-licensed spectrum and is resistant to multi-path RF propagation errors.

By utilizing discrete frequencies for signals transmitted from the Resident Units, a plurality of Resident Units simultaneously can be tracked. The Resident Units also can be equipped with memory in order to store optional sensory information, and flash memory for upload/download capability. Resident Units may further have an emergency calling/notification feature configured therein.

The present system is portable and can easily be moved from one location to another. Alternatively, the slave units can be permanently installed and wired if desired.

All control and display functions can be provided by a standard PC or notebook computer. Applications and features can be determined by associated software. The system is fully internet-compatible, with appropriate I/O devices.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

What is claimed is:

1. A positioning system, comprising:
    a command signal generator structured to transmit a command signal;
    a subject module structured to receive the command signal and emit a subject signal responsive thereto;
    a plurality of sensor modules arrayed in a defined three-dimensional space and structured to detect the subject signal;
    a plurality of counters corresponding to the plurality of sensors, each of said counters configured to count an increment relating to reception of the subject signal by the corresponding sensor module;
    a comparator configured to compare the plurality of increments and generate a plurality of counter differential values; and
    a correlator configured to correlate the plurality of counter differential values to determine a subject location in the defined space.

2. The system of claim 1, further comprising:
    a calibration module disposed in a predetermined location in the defined three-dimensional space relative to the plurality of sensor modules and structured to transmit a calibration signal.

3. The system of claim 1 wherein the counter has an increment of about $10^{-7}$ seconds.

4. The system of claim 1 wherein the counter has an increment of about $10^{-8}$ seconds.

5. The system of claim 1 wherein the counter has an increment of about $10^{-9}$ seconds.

6. The system of claim 1, further comprising:
    a plurality of subject modules, each of said subject modules having a unique transmission identity.

7. The system of claim 1 wherein the subject module further includes a memory.

8. The system of claim 1 wherein the correlator is configured to determine a subject location in the defined space in real time.

9. A method for locating a subject, comprising:
    transmitting a signal to a subject unit located within a defined three-dimensional space;
    transmitting a signal to slave units located within the defined three-dimensional space, each slave unit configured to start a 1 GHz counter from a counter start value;
    transmitting a subject signal from the subject unit located within a defined three-dimensional space;
    stopping said counters of said slave units to define counter stop values;
    determining net counter values for each slave unit;
    comparing the net counter values to determine counter difference values; and
    correlating said counter difference values to determine a subject unit location in the three-dimensional space.

10. The method of claim 9 wherein correlating comprises correlating said counter difference values to determine a subject unit location in three dimensions.

11. The method of claim 9 wherein correlating comprises correlating said counter difference values to determine a subject unit location to within three feet.

12. The method of claim 9 wherein correlating comprises correlating said counter difference values to determine a subject unit location to within one foot.

13. The method of claim 9 wherein correlating comprises said correlating counter difference values to determine a subject unit location in the three-dimensional space in real time.

14. The method of claim 9, further comprising:
receiving data from said subject unit.

15. The method of claim 9, further comprising:
transmitting a calibration signal to the slave units from a calibration unit located at a preselected position within the defined three-dimensional space;

stopping said counters of said slave units to define calibration counter stop values;

determining net calibration counter values for each slave unit;

comparing the net calibration counter values to determine calibration difference values;

correlating said counter difference values to determine the calibration unit location in the three-dimensional space; and comparing the determined calibration unit location to a reference value for the preselected position of the calibration unit.

* * * * *